US012472741B2

(12) United States Patent
Sasaki et al.

(10) Patent No.: US 12,472,741 B2
(45) Date of Patent: Nov. 18, 2025

(54) INKJET RECORDING APPARATUS CAPABLE OF SUPPRESSING INK SMUDGE ON CONVEYING BELT

(71) Applicant: KYOCERA Document Solutions Inc., Osaka (JP)

(72) Inventors: Yu Sasaki, Osaka (JP); Yoshiya Kusunoki, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 143 days.

(21) Appl. No.: 18/590,839

(22) Filed: Feb. 28, 2024

(65) Prior Publication Data

US 2024/0294007 A1 Sep. 5, 2024

(30) Foreign Application Priority Data

Mar. 2, 2023 (JP) ................................ 2023-031897

(51) Int. Cl.

| | |
|---|---|
| ***B41J 2/17*** | (2006.01) |
| ***B41J 2/045*** | (2006.01) |
| ***B41J 2/165*** | (2006.01) |
| ***B41J 13/08*** | (2006.01) |

(52) U.S. Cl.

CPC ....... *B41J 2/04581* (2013.01); *B41J 2/04573* (2013.01); *B41J 2/16526* (2013.01); *B41J 2/17* (2013.01); *B41J 13/08* (2013.01)

(58) Field of Classification Search

CPC .. B41J 11/007; B41J 2/04596; B41J 2/04598; B41J 2/1652; B41J 2/16526; B41J 2/16529; B41J 2/1721; B41J 2/1742; B41J 13/08

See application file for complete search history.

(56) References Cited

U.S. PATENT DOCUMENTS

2005/0162452 A1* 7/2005 Kachi .................... B41J 29/377 347/13
2012/0194585 A1* 8/2012 Fukuda .................... B41J 29/38 347/9
2014/0063104 A1* 3/2014 Somete ............... B41J 2/04536 347/14

FOREIGN PATENT DOCUMENTS

JP 2017217766 A 12/2017

* cited by examiner

*Primary Examiner* — Scott A Richmond

(74) *Attorney, Agent, or Firm* — Alleman Hall & Tuttle LLP

(57) ABSTRACT

An inkjet recording apparatus includes a conveying belt and a control portion. The conveying belt includes a flushing area formed with an opening. During sheet conveyance, the control portion causes a recording head to perform flushing processing in which ink is discharged toward the opening of the flushing area not overlapping with the sheet. The control portion causes the recording head to perform, before discharging the ink, meniscus oscillation processing in which a meniscus of ink in each nozzle of the recording head is caused to oscillate. When causing the nozzle to perform the meniscus oscillation processing before the flushing processing, the control portion sets a number of oscillations of the meniscus oscillation processing based on an amount of time that has elapsed before the flushing processing to be performed this time since the flushing processing performed last time by the nozzle that performs the meniscus oscillation processing this time.

4 Claims, 10 Drawing Sheets

INKJET RECORDING APPARATUS CAPABLE OF SUPPRESSING INK SMUDGE ON CONVEYING BELT

INCORPORATION BY REFERENCE

This application is based upon and claims the benefit of priority from the corresponding Japanese Patent Application No. 2023-031897 filed on Mar. 2, 2023, the entire contents of which are incorporated herein by reference.

BACKGROUND

The present disclosure relates to an inkjet recording apparatus.

A conventional inkjet recording apparatus includes a recording head that discharges ink. The conventional inkjet recording apparatus conveys a sheet and discharges ink from a recording head toward the sheet. Thus, an image is formed (that is, printed) on the sheet.

SUMMARY

An inkjet recording apparatus according to an aspect of the present disclosure includes a conveying belt, a recording head, and a control portion. The conveying belt conveys a sheet. The recording head includes a plurality of nozzles that discharge ink and discharges the ink toward the sheet to form an image on the sheet. The control portion controls the recording head. The conveying belt includes a flushing area formed with an opening. The flushing area is arranged plurally in a movement direction of the conveying belt with intervals provided therebetween. During conveyance of the sheet, the control portion causes the recording head to carry out, separate from image forming processing in which the ink is discharged toward the sheet, flushing processing in which the ink is discharged toward the opening of the flushing area not overlapping with the sheet. The control portion causes the recording head to carry out, before discharging the ink, meniscus oscillation processing in which a meniscus of the ink in each of the nozzles is caused to oscillate. The control portion controls, for each of the nozzles, the meniscus oscillation processing that is carried out before the image forming processing and the meniscus oscillation processing that is carried out before the flushing processing. When causing the nozzle to carry out the meniscus oscillation processing that is carried out before the image forming processing, the control portion sets a number of oscillations of the meniscus oscillation processing that is carried out before the image forming processing based on a first amount of time that has elapsed before the image forming processing to be carried out this time since the image forming processing carried out last time by the nozzle that is to carry out the meniscus oscillation processing this time. When causing the nozzle to carry out the meniscus oscillation processing that is carried out before the flushing processing, the control portion sets a number of oscillations of the meniscus oscillation processing that is carried out before the flushing processing based on a second amount of time that has elapsed before the flushing processing to be carried out this time since the flushing processing carried out last time by the nozzle that is to carry out the meniscus oscillation processing this time.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, an embodiment of the present disclosure will be described with reference to FIG. 1 to FIG. 12 while taking a printer 100 which performs printing on a sheet S as a recording medium as an example. A type of the sheet S is not limited in particular. For example, paper is used as the sheet S. It is noted that in descriptions below, a direction perpendicular to a setting surface of the printer 100 (for example, a flat floor surface) is defined as an up-down direction.

<Overall Configuration of Printer>

Figure 1:
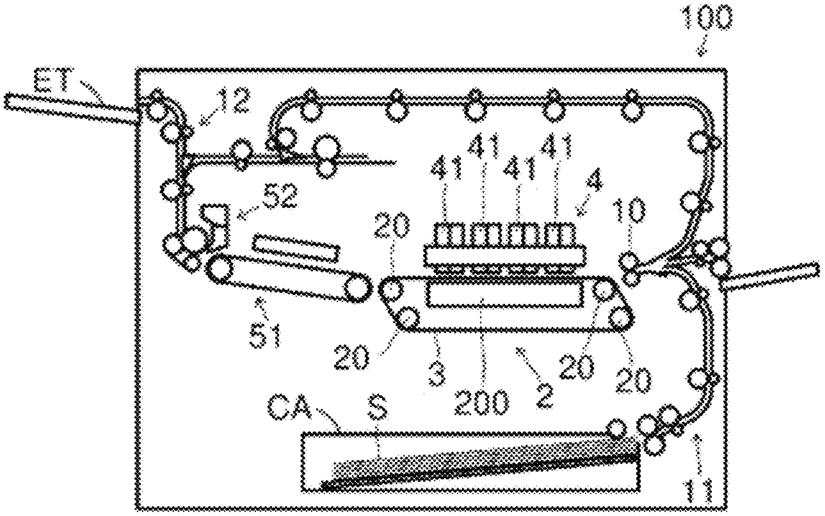
FIG. 1 is a schematic diagram of an inkjet recording apparatus according to one embodiment.

As shown in FIG. 1, the printer 100 (corresponding to an "inkjet recording apparatus") according to the present embodiment includes a first conveying portion 11 and a second conveying portion 12. The first conveying portion 11 feeds the sheet S set in a sheet feed cassette CA and conveys the sheet S toward a printing position. In a printing job executed by the printer 100, ink is discharged onto the sheet S that passes through the printing position. Thus, an image is printed on the sheet S. In other words, in the printing job executed by the printer 100, an image formed of ink is formed on the sheet S. The second conveying portion 12 conveys the printed sheet S. The second conveying portion 12 discharges the printed sheet S onto a discharge tray ET.

The first conveying portion 11 includes a plurality of conveying roller members including a registration roller pair 10. In FIG. 1, only the registration roller pair 10 is denoted by the reference numeral out of the plurality of conveying roller members. Each of the plurality of conveying roller members rotates to convey the sheet S. The registration roller pair 10 includes a pair of rollers that are brought into pressure contact with each other. A registration nip is formed between the pair of rollers constituting the registration roller pair 10. The sheet S fed from the sheet feed cassette CA enters the registration nip. The registration roller pair 10 rotates to convey the sheet S toward a belt conveying portion 2 to be described later.

It is noted that the rotation of the registration roller pair 10 is stopped at a time point a front end of the sheet S reaches the registration nip. On the other hand, the conveying roller members that are more on an upstream side of a conveying direction of the sheet S than the registration roller pair 10 are rotating. Thus, skew of the sheet S is corrected.

The printer 100 includes the belt conveying portion 2. The belt conveying portion 2 receives the sheet S from the first conveying portion 11 and conveys the sheet S. The belt conveying portion 2 includes a plurality of tension rollers 20. The plurality of tension rollers 20 are supported rotatably. The belt conveying portion 2 also includes a conveying belt 3. The conveying belt 3 is an endless belt. The conveying belt 3 is rotatably stretched across the plurality of tension rollers 20. The sheet S is conveyed from the first conveying portion 11 toward the belt conveying portion 2, and the sheet S reaches an outer circumferential surface of the conveying belt 3.

One of the plurality of tension rollers 20 is coupled to a belt motor 60 (see FIG. 4) and thus rotates by being transmitted with a driving force of the belt motor 60. By the rotation of the tension roller 20 coupled to the belt motor 60, the conveying belt 3 moves, and the other tension rollers 20 are driven to rotate. In other words, the conveying belt 3 rotates.

Further, the belt conveying portion 2 includes a suction unit 200. The suction unit 200 is arranged on an inner circumferential side of the conveying belt 3. The suction unit 200 sucks the sheet S on the outer circumferential surface of the conveying belt 3 from the inner circumferential side of the conveying belt 3.

Specifically, the conveying belt 3 has a plurality of suction holes (not shown). The suction holes of the conveying belt 3 penetrate through the conveying belt 3 in a thickness direction thereof. The suction unit 200 sucks the sheet S on the outer circumferential surface of the conveying belt 3 via the suction holes of the conveying belt 3. Thus, the sheet S is sucked and attached to the outer circumferential surface of the conveying belt 3. The conveying belt 3 rotates while retaining the sheet S sucked and attached to the outer circumferential surface thereof. In other words, the conveying belt 3 conveys the sheet S in a state where the sheet S is sucked and attached to the outer circumferential surface thereof. That is, the conveying belt 3 moves (that is, rotates) to convey the sheet S. The rotation direction of the conveying belt 3 corresponds to a "movement direction".

The printer 100 includes a recording portion 4. The recording portion 4 is arranged so as to oppose the outer circumferential surface of the conveying belt 3 in the up-down direction. During conveyance of the sheet S by the conveying belt 3, the sheet S on the outer circumferential surface of the conveying belt 3 and the recording portion 4 oppose each other in the up-down direction with an interval provided therebetween. Thus, during conveyance of the sheet S by the conveying belt 3, the sheet S passes through a gap between a nozzle surface of a recording head 40 to be described later and the outer circumferential surface of the conveying belt 3. In other words, the gap between the nozzle surface of the recording head 40 and the outer circumferential surface of the conveying belt 3 becomes a part of a conveying path of the sheet S. It is noted that the recording head 40 is arranged above the conveying belt 3, and the nozzle surface of the recording head 40 faces downward.

Figure 2:
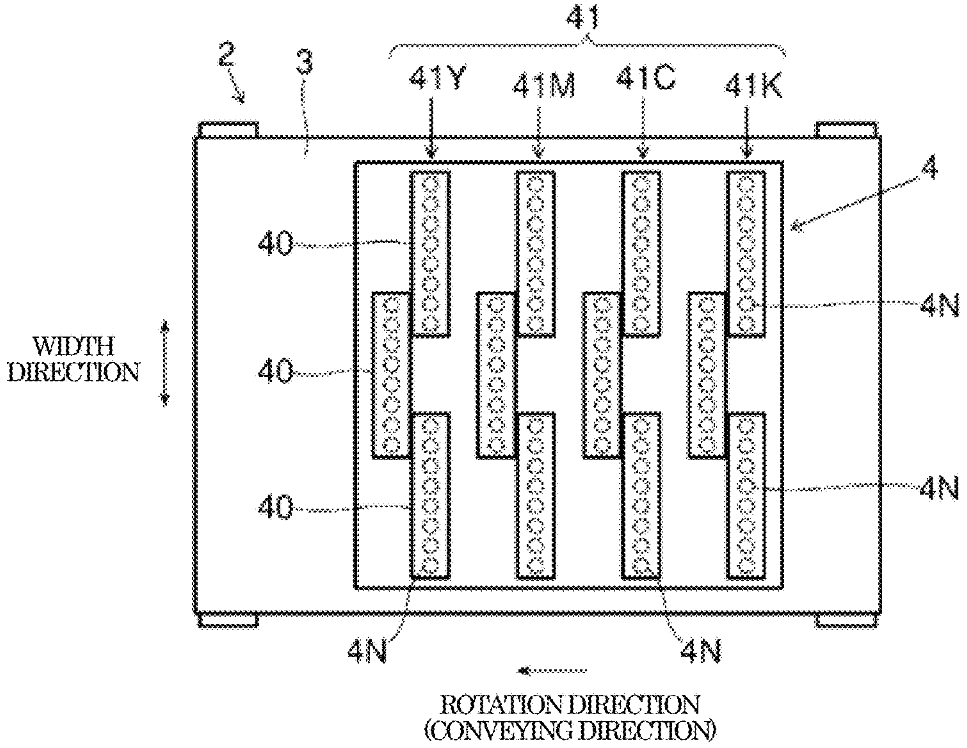
FIG. 2 is a plan view of a recording portion of the inkjet recording apparatus according to one embodiment.

As shown in FIG. 2, the recording portion 4 includes four line heads 41 respectively corresponding to colors of cyan, magenta, yellow, and black. In FIG. 2, the cyan line head 41 is denoted by a symbol "C", the magenta line head 41 is denoted by a symbol "M", the yellow line head 41 is denoted by a symbol "Y", and the black line head 41 is denoted by a symbol "K" to distinguish one from the other. The same holds true for FIG. 3 that is to be referenced in later descriptions.

The line heads 41 of the respective colors each include a plurality of (for example, three) recording heads 40. For example, the plurality of recording heads 40 of each color are arranged in a staggered pattern in a direction orthogonal to the conveying direction of the sheet S by the conveying belt 3. In descriptions below, the direction orthogonal to the conveying direction of the sheet S by the conveying belt 3 will simply be referred to as a width direction.

The respective recording heads 40 are arranged with an interval provided between the recording heads 40 and the outer circumferential surface of the conveying belt 3 in the up-down direction. In other words, the respective recording heads 40 are arranged at positions opposing the sheet S conveyed by the conveying belt 3 in the up-down direction. That is, the conveying belt 3 sucks and attaches the sheet S and conveys it at a position below the respective recording heads 40. The direction orthogonal to the conveying direction of the sheet S by the conveying belt 3 and the width direction is the up-down direction.

Each of the recording heads 40 includes, as a nozzle surface, a surface opposing the outer circumferential surface of the conveying belt 3 in the up-down direction. The nozzle surface of each of the recording heads 40 includes a plurality of nozzles 4N. The plurality of nozzles 4N of each of the recording heads 40 downwardly discharge ink of the corresponding color. For example, the numbers of nozzles 4N of the respective recording heads 40 are the same. The plurality of nozzles 4N of each of the recording heads 40 are arranged along the width direction of the conveying belt 3. In FIG. 2, the nozzles 4N are indicated by broken lines. In actuality, a larger number of nozzles 4N are provided in each of the recording heads 40.

Based on image data to be printed on the sheet S in the printing job, the respective recording heads 40 discharge ink from the nozzles 4N toward the sheet S on the outer circumferential surface of the conveying belt 3. The ink discharged from the respective recording heads 40 adheres onto the sheet S. Thus, an image is formed on the sheet S. In other words, a position between the respective recording heads 40 and the conveying belt 3 is the printing position, and printing with respect to the sheet S is carried out at that printing position.

Figure 3:
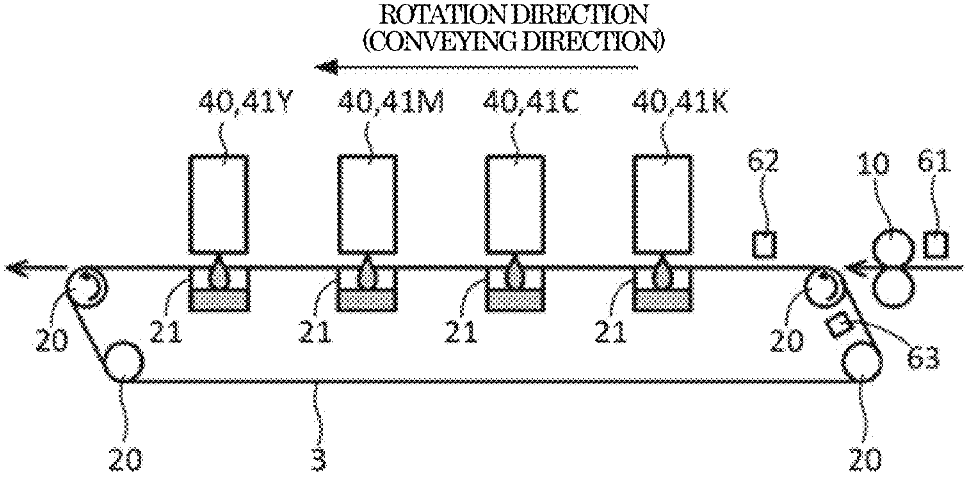
FIG. 3 is a schematic diagram of a conveying belt and a periphery thereof in the inkjet recording apparatus according to one embodiment.

It is noted that as shown in FIG. 3, waste ink tanks 21 are arranged on the inner circumferential side of the conveying belt 3. The waste ink tanks 21 store ink discharged in flushing processing to be described later. Ink in the waste ink tanks 21 is discarded.

Referring back to FIG. 1, the printer 100 includes a drying unit 51 and a decurler 52. The drying unit 51 dries, while conveying the sheet S toward the decurler 52, the ink that has adhered onto the sheet S that is being conveyed. The decurler 52 corrects a curl of the sheet S. The decurler 52 conveys the sheet S whose curl has been corrected toward the second conveying portion 12.

Figure 4:
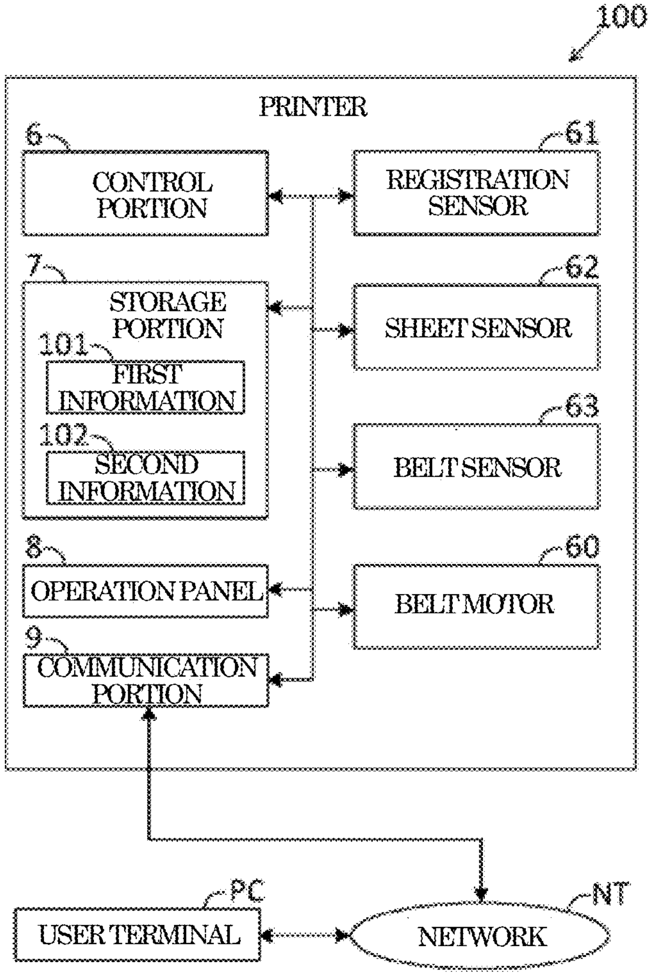
FIG. 4 is a block diagram of the inkjet recording apparatus according to one embodiment.

Further, as shown in FIG. 4, the printer 100 includes a control portion 6. The control portion 6 includes processing circuits such as a CPU and an ASIC. The control portion 6 controls the printing job. Specifically, the control portion 6 controls the belt motor 60 to cause the conveying belt 3 to move (that is, rotate) appropriately. The control portion 6 controls the conveyance of the sheet S by the conveying belt 3. Moreover, the control portion 6 controls discharge of the ink by the respective recording heads 40. In addition, the control portion 6 controls the flushing processing and also controls meniscus oscillation processing, the details of which will be given later.

A registration sensor 61, a sheet sensor 62, and a belt sensor 63 are connected to the control portion 6. Respective detection positions (arrangement positions) of the registration sensor 61, the sheet sensor 62, and the belt sensor 63 are shown in FIG. 3.

The detection position of the registration sensor 61 is a position more on an upstream side of the conveying direction of the sheet S than the registration nip. The registration sensor 61 is, for example, a reflective photosensor or a transmissive photosensor. The registration sensor 61 varies output values in accordance with presence/absence of the sheet S at the corresponding detection position.

The control portion 6 detects an arrival of a front end and passing of a rear end of the sheet S at the detection position of the registration sensor 61 based on the output values of the registration sensor 61. In other words, the control portion 6 detects the arrival of the front end and the passing of the rear end of the sheet S at the registration nip based on the output values of the registration sensor 61. The control portion 6 measures a conveyance start timing of the sheet S by the registration roller pair 10 (a rotation start timing of the registration roller pair 10) based on an amount of time that has elapsed since the arrival of the front end of the sheet S has been detected at the detection position of the registration sensor 61.

The detection position of the sheet sensor 62 is a position between the printing position of the line head 41 on the most upstream side of the conveying direction of the sheet S out of the plurality of line heads 41 and the registration nip. The sheet sensor 62 varies output values in accordance with presence/absence of the sheet S at the corresponding detection position. As the sheet sensor 62, a CIS (Contact Image Sensor) may be used, or a reflective photosensor or a transmissive photosensor may be used. For example, a CIS is used as the sheet sensor 62.

The control portion 6 detects the arrival of the front end and the passing of the rear end of the sheet S at the detection position of the sheet sensor 62 based on the output values of the sheet sensor 62. The control portion 6 measures an ink discharge timing with respect to the sheet S conveyed by the conveying belt 3 based on the output values of the sheet sensor 62. The ink discharge timing with respect to the sheet S conveyed by the conveying belt 3 may be measured based on the amount of time that has elapsed since the start of conveyance of the sheet S by the registration roller pair 10.

Further, the control portion 6 measures a sheet passing time from when the front end of the sheet S reaches the detection position of the sheet sensor 62 to when the rear end of the same sheet S passes through the detection position of the sheet sensor 62. The sheet passing time at the detection position of the sheet sensor 62 varies according to the size of the sheet S in the conveying direction. In this regard, the control portion 6 recognizes the size of the sheet S conveyed by the conveying belt 3 in the conveying direction based on the sheet passing time. Thus, even when the sheet S conveyed by the conveying belt 3 is of an atypical size, the size of the sheet S in the conveying direction can be detected by the control portion 6.

Furthermore, the control portion 6 detects a positional deviation of the sheet S (including skew of the sheet S) based on the output values of the sheet sensor 62 (read data obtained by reading by the sheet sensor 62). For example, a positional deviation of the sheet S may occur at or after the start of the conveyance of the sheet S by the registration roller pair 10. In this case, the positional deviation of the sheet S is detected by the control portion 6.

It is noted that a plurality of sheet sensors 62 may be installed. For example, two sheet sensors 62 may be installed.

The belt sensor 63 is a sensor for detecting a predetermined reference position (a home position) of the conveying belt 3. A predetermined mark is provided at the reference position of the conveying belt 3. Thus, the reference position of the conveying belt 3 can be detected based on the output value of the belt sensor 63. For example, a CIS is used as the belt sensor 63. Alternatively, a transmissive photosensor or a reflective photosensor may be used to constitute the belt sensor 63.

The control portion 6 detects the reference position of the conveying belt 3 based on the output value of the belt sensor 63. In other words, the control portion 6 detects a position of a flushing area 30 (see FIG. 6) in the rotation direction of the conveying belt 3 based on the output value of the belt sensor 63.

Moreover, as shown in FIG. 4, the printer 100 includes a storage portion 7. The storage portion 7 includes storage devices such as a ROM, a RAM, an HDD, and an SSD. The storage portion 7 stores various types of information. The storage portion 7 is connected to the control portion 6. The control portion 6 reads information from the storage portion 7. The control portion 6 also writes information to the storage portion 7.

The printer 100 includes an operation panel 8. The operation panel 8 is provided with, for example, a touch screen. The touch screen displays software buttons, messages, and the like and accepts touch operations from users. Further, the operation panel 8 is also provided with hardware buttons for accepting settings, instructions, and the like. The operation panel 8 is connected to the control portion 6. The control portion 6 controls display operations of the operation panel 8 (the touch screen). Furthermore, the control portion 6 detects operations made on the operation panel 8.

The printer 100 includes a communication portion 9. The communication portion 9 includes a communication circuit and the like. The communication portion 9 is connected to a user terminal PC via a network NT. The user terminal PC is an information processing apparatus such as a personal computer. The control portion 6 uses the communication portion 9 to communicate with the user terminal PC.

Printing data (data including PDL data and the like) of a printing job is transmitted from the user terminal PC to the printer 100. In other words, a printing job execution request is transmitted from the user terminal PC to the printer 100. The printing data of the printing job includes various types of setting data related to printing, such as a size of the sheet S to be used in the printing job. The communication portion 9 receives the printing data of the printing job. When the printing data of the printing job is received by the communication portion 9, the control portion 6 determines that the printing job execution request has been accepted.

Figure 5:
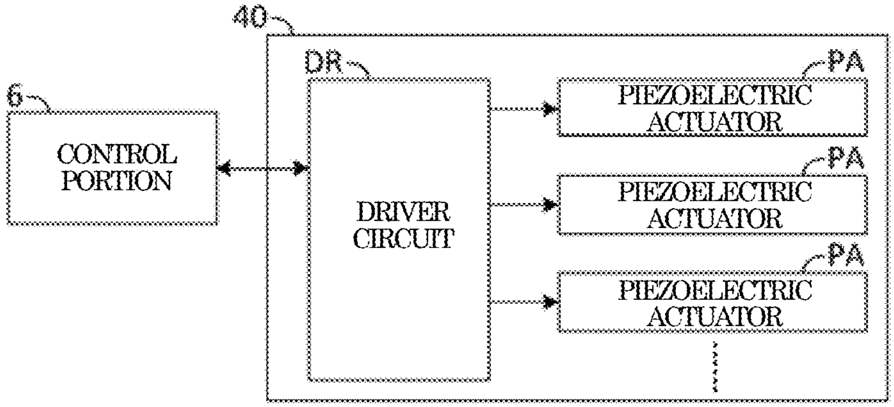
FIG. 5 is a block diagram of a recording head and a periphery thereof in the inkjet recording apparatus according to one embodiment.

Further, as shown in FIG. 5, each of the recording heads 40 includes piezoelectric actuators PA. The piezoelectric actuators PA are provided on a vibration plate constituting an upper wall of each of the recording heads 40. Moreover, each of the recording heads 40 includes a driver circuit DR. It is noted that the configurations of the respective recording heads 40 are the same. Therefore, FIG. 5 shows a block diagram of only one of the recording heads 40 for convenience.

The piezoelectric actuators PA are allocated one each to the respective nozzles 4N. The piezoelectric actuator PA includes a piezoelectric element. The piezoelectric element is, for example, a piezo element. The piezoelectric actuator PA is deformed by being applied with a predetermined driving voltage. By the corresponding piezoelectric actuators PA being deformed, the respective nozzles 4N discharge ink.

The driver circuit DR of each of the recording heads 40 is connected to the control portion 6. The driver circuit DR is connected to a driving voltage generation circuit (not shown). The driving voltage generation circuit generates a driving voltage of the piezoelectric actuators PA and supplies the driving voltage to the driver circuit DR as the connection destination. The driver circuit DR turns ON/OFF the voltage application to the piezoelectric actuators PA. The control portion 6 supplies a driving signal to the driver circuit DR to apply a driving voltage to the piezoelectric actuator PA of the nozzle 4N that is to discharge ink. By applying the driving voltage to the corresponding piezoelectric actuator PA, the nozzle 4N discharges ink.

<Configuration of Conveying Belt>

Figure 6:
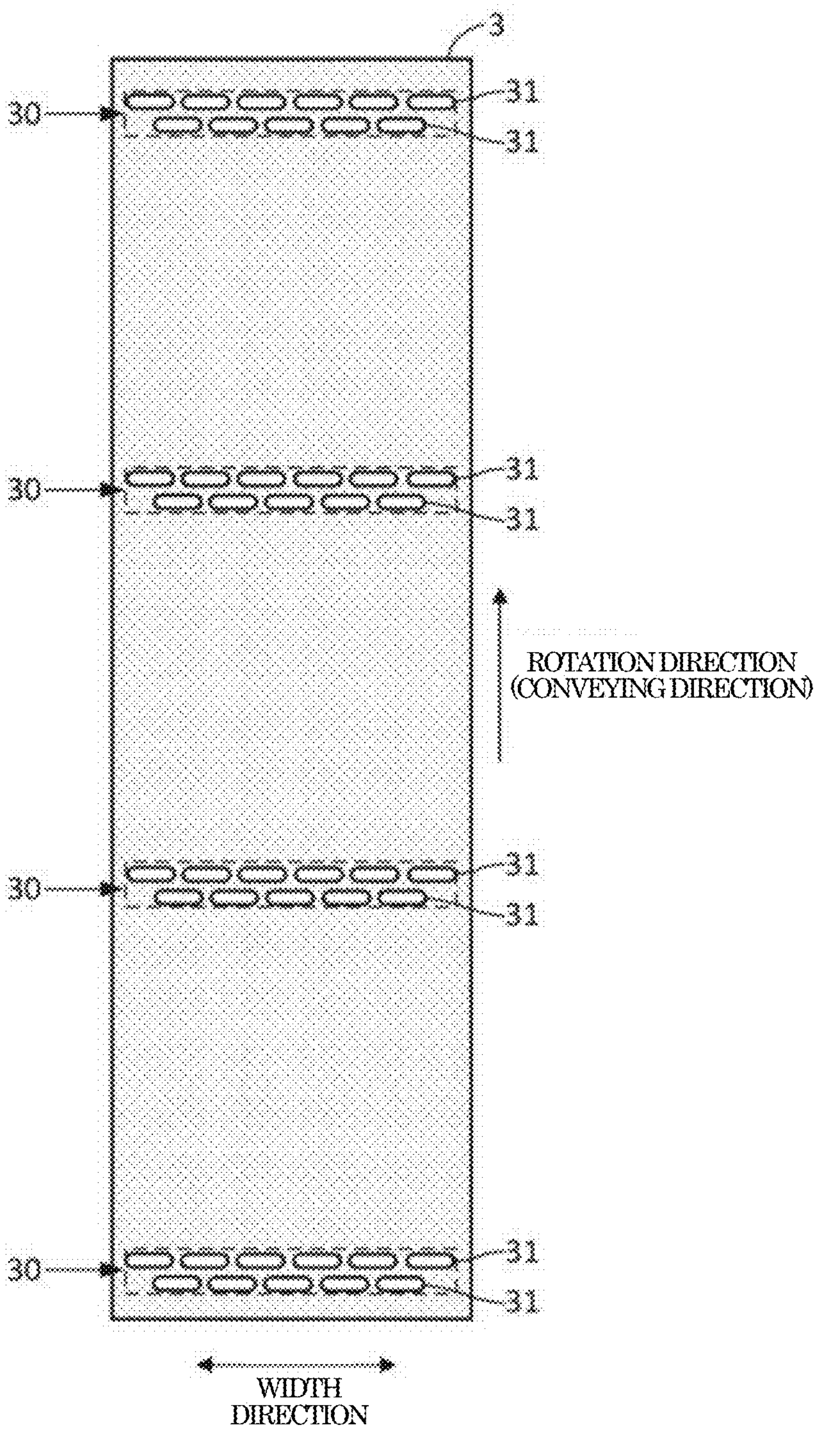
FIG. 6 is a plan view of the conveying belt of the inkjet recording apparatus according to one embodiment.

As shown in FIG. 6, the conveying belt 3 includes the flushing area 30. In FIG. 6, the flushing area 30 is enclosed by a broken line. The flushing area 30 is an area formed with openings 31 that penetrate the conveying belt 3 in the thickness direction. Although details will be given later, in the flushing processing, ink is discharged from the respective recording heads 40, and the discharged ink passes through the openings 31 to reach the inner circumferential side of the conveying belt 3 and thus be stored in the waste ink tank 21.

It is noted that a plurality of flushing areas 30 are provided in the conveying belt 3. The plurality of flushing areas 30 are arranged at predetermined intervals in the rotation direction of the conveying belt 3. In the conveying belt 3, the flushing areas 30 and areas other than the flushing areas 30 (symbols are omitted) are provided alternately in the rotation direction.

The flushing areas 30 each have a plurality of (the same in number) openings 31. The opening 31 is a long hole elongated in the width direction of the conveying belt 3. The shape of the opening 31 (the shape seen from the thickness direction of the conveying belt 3) is not limited in particular and may be a rectangular shape, a circular shape, a shape of an ellipse, or an oval shape.

For example, each of the flushing areas 30 includes two rows of openings. The row of openings is a row of the openings 31 arranged at regular intervals in the width direction of the conveying belt 3. One of the two rows of openings includes N (six in FIG. 6) openings 31, and the other one of the two rows of openings includes N−1 (five in FIG. 6) openings 31. Further, a center position of either of the rows of openings in the width direction is arranged at a center position of the conveying belt 3 in the width direction. Specifically, the plurality of openings 31 of each of the flushing areas 30 are arranged in a staggered pattern in the width direction. It is noted that a length of the opening 31 in the width direction (an opening width) is larger than an interval between one opening 31 and another opening 31 adjacent to each other in the width direction.

Figure 7:
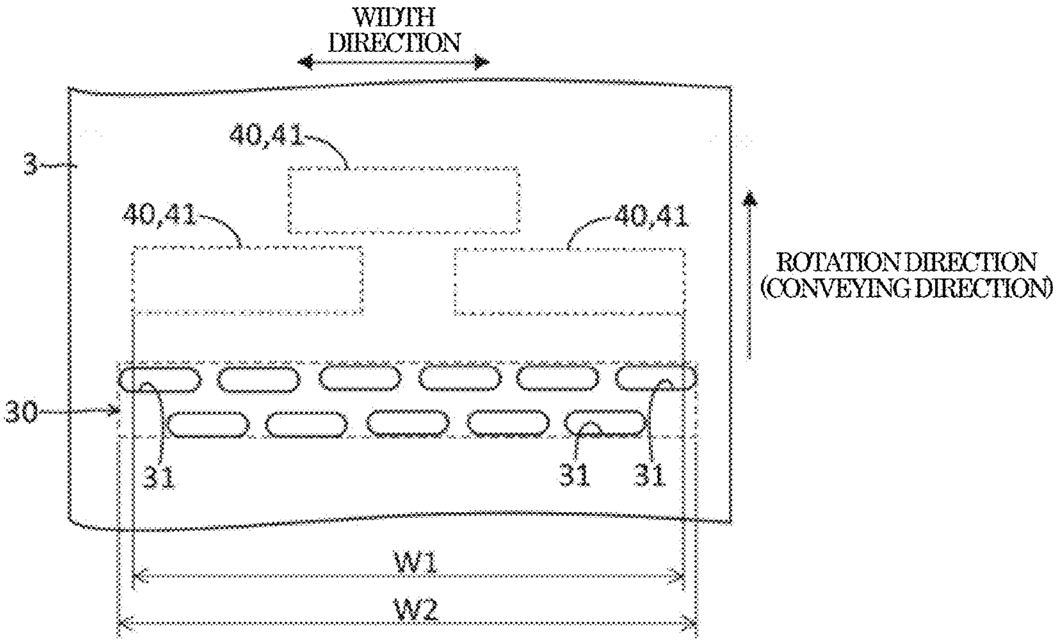
FIG. 7 is a diagram showing a positional relationship between a flushing area of the conveying belt and the recording heads in the inkjet recording apparatus according to one embodiment.

Further, as shown in FIG. 7, a width W1 (mm) is smaller than a width W2 (mm). It is noted that the width W1 corresponds to a length of the line heads 41 in the width direction. Specifically, the width W1 corresponds to a length in the width direction, which is from an outermost end of the recording head 40 positioned at an outermost position on one of the two sides in the width direction to an outermost end of the recording head 40 positioned at an outermost position on the other one of the two sides in the width direction. The width W2 corresponds to a length of the flushing area 30 in the width direction. Specifically, the width W2 corresponds to a length in the width direction, which is from an outermost end of the opening 31 positioned at an outermost position on one of the two sides in the width direction to an outermost end of the opening 31 positioned at an outermost position on the other one of the two sides in the width direction.

Thus, by the rotation of the conveying belt 3, each of the plurality of nozzles 4N opposes at least one of the openings 31 in the up-down direction.

<Sheet Conveyance Control>

In a consecutive printing job which is a printing job for consecutively forming an image on a plurality of sheets S of the same size that are sequentially conveyed by the conveying belt 3, the control portion 6 performs control so that a space between the sheets that is an interval between a rear end of a preceding sheet S and a front end of a following sheet S (the next sheet S conveyed after the preceding sheet S) in the conveying direction becomes constant. In other words, the control portion 6 performs control so that the plurality of sheets S are consecutively conveyed at constant intervals. That is, the control portion 6 maintains the spaces between the sheets that are caused when consecutively conveying the plurality of sheets S at constant intervals.

Herein, in the consecutive printing job, the control portion 6 recognizes the size of the sheets S conveyed by the conveying belt 3. Further, the control portion 6 detects a reference position of the conveying belt 3. Then, the control portion 6 measures the conveyance start timing of the sheets S from the registration roller pair 10 to the conveying belt 3 so that the flushing area 30 appears in the space between the sheets at a constant cycle. The control portion 6 varies the conveyance start timing of the sheets S from the registration roller pair 10 to the conveying belt 3 in accordance with the size of the sheets S conveyed by the conveying belt 3. It is noted that the control portion 6 recognizes the size of the sheets S to be used in the printing job (the sheets S conveyed by the conveying belt 3) based on printing data of the printing job.

Figure 8:
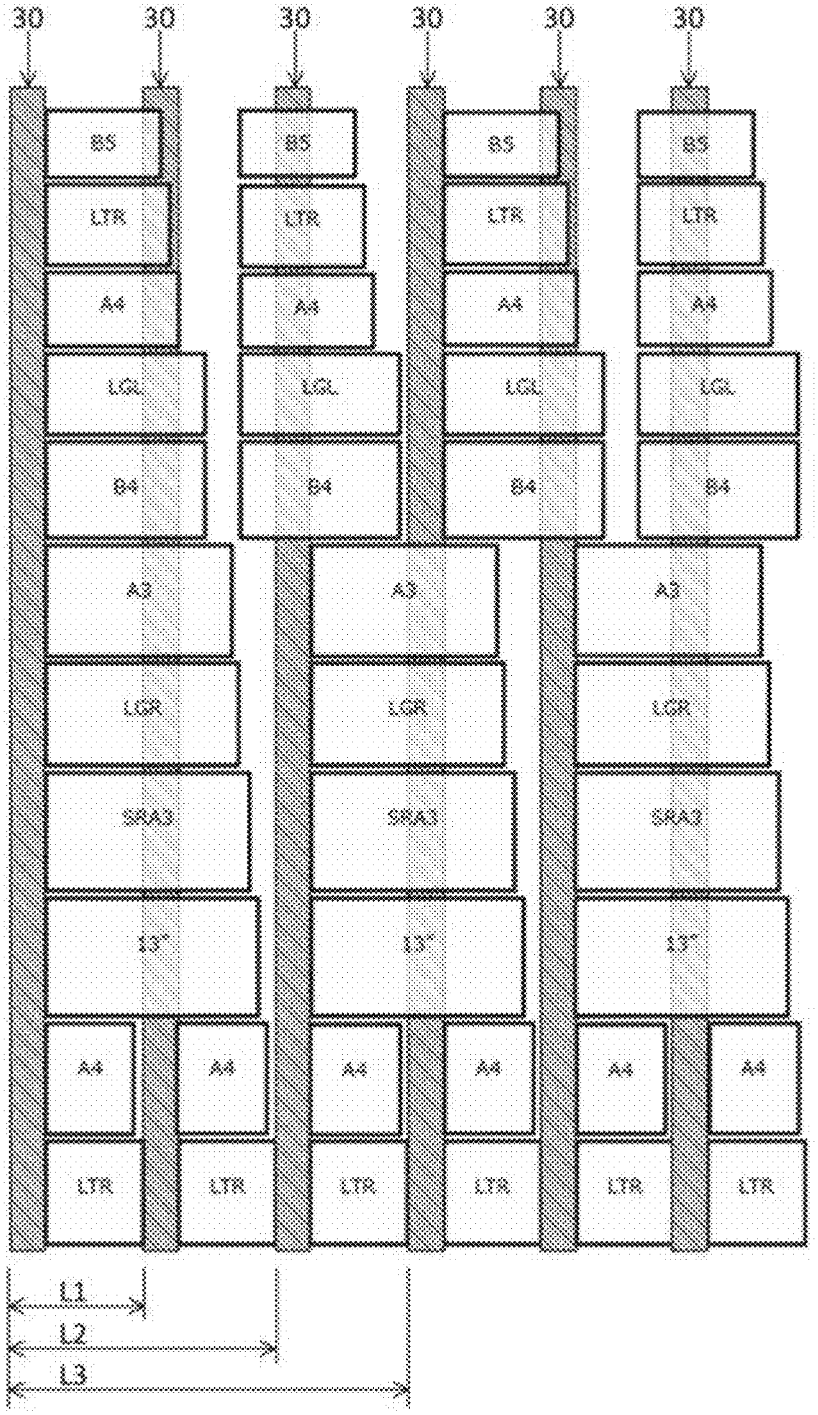
FIG. 8 is a diagram showing positional relationships among the flushing areas of the conveying belt and sheets in the inkjet recording apparatus according to one embodiment.

Positional relationships among the sheets S conveyed by the conveying belt 3 and the flushing areas 30 are shown in FIG. 8. In FIG. 8, the rotation direction of the conveying belt 3 (that is, the conveying direction of the sheets S) is a direction from right to left on the sheet surface. In FIG. 8, the flushing areas 30 are hatched, and illustrations of the openings 31 are omitted. Also in FIG. 8, the symbols of the sheets S are omitted, and sizes of the sheets S are noted in the figures indicating the sheets S instead. It is noted that for convenience, FIG. 8 collectively shows the plurality of sheets S of different sizes.

Figure 9:
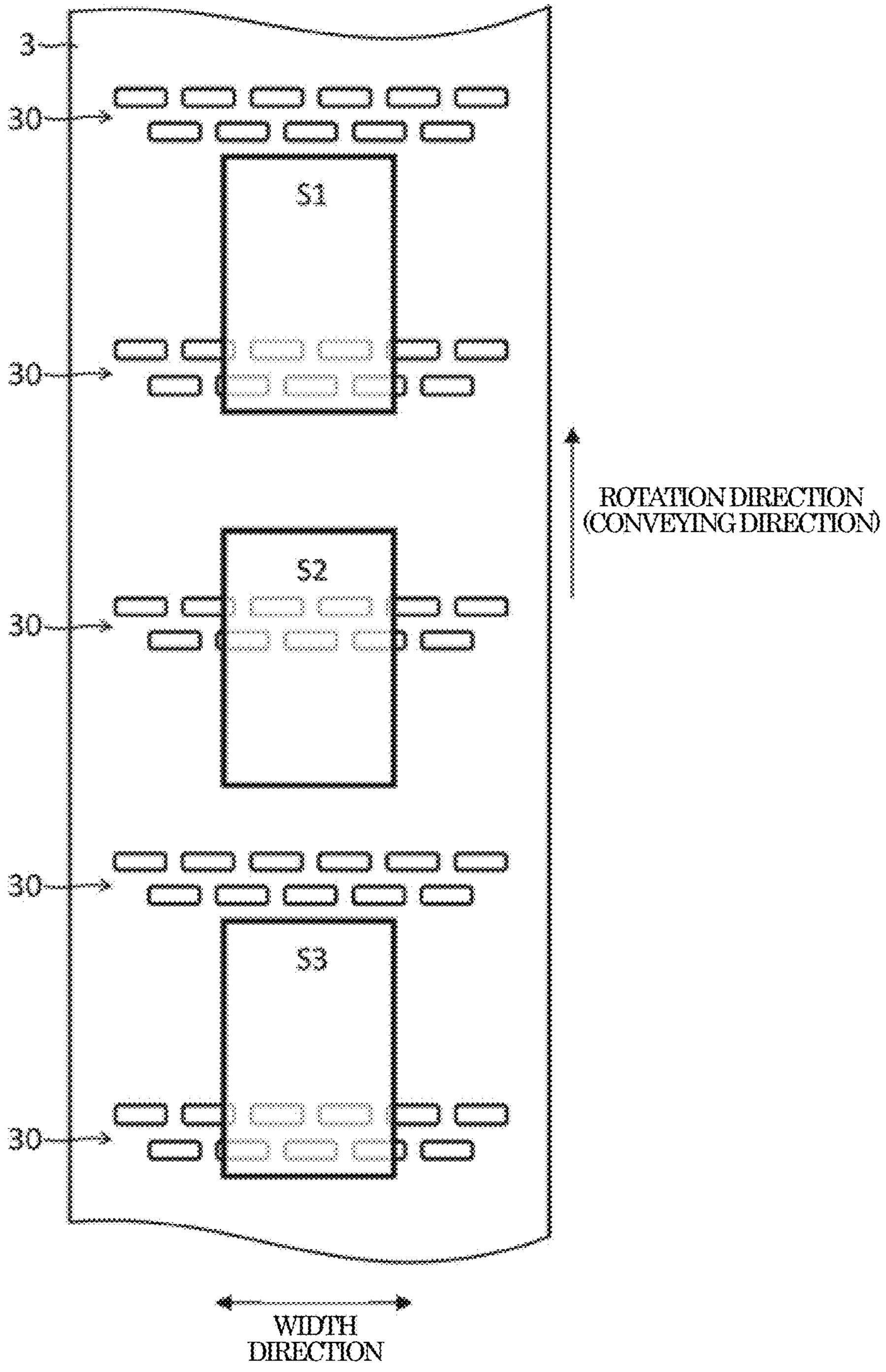
FIG. 9 is a diagram for explaining a sheet conveying timing with respect to the conveying belt in the inkjet recording apparatus according to one embodiment.

Herein, with reference to FIG. 9, detailed descriptions will be given while focusing on the sheets S of an A4 size in portrait orientation (the sheets S on the third row from the top in FIG. 8). In FIG. 9, the rotation direction of the conveying belt 3 (that is, the conveying direction of the sheets S) is a direction from bottom to top on the sheet surface. FIG. 9 shows three sheets S for convenience, and numbers 1 to 3 indicating an order of conveyance are allocated to the symbols of the respective sheets S.

When the size of the sheets S is the A4 size in portrait orientation, the flushing area 30 does not appear in a space between the first sheet S1 and the second sheet S2. The flushing area 30 appears in a space between the second sheet S2 and the third sheet S3. The flushing area 30 in the space between the sheet S2 and the sheet S3 does not overlap at all with both the sheet S2 and the sheet S3. Although not shown, the flushing area 30 does not appear in a space between the third sheet S3 and the fourth sheet S, and the flushing area 30 appears in a space between the fourth sheet S and the fifth sheet S.

<General Outline of Flushing Processing>

Viscosity of ink in the nozzle 4N having a low ink discharge frequency out of the plurality of nozzles 4N increases with time. As a result, clogging occurs, and thus image quality deteriorates. For suppressing such an inconvenience, each of the recording heads 40 carries out the flushing processing separately from the image forming processing while executing the consecutive printing job (that is, while conveying the sheets S by the conveying belt 3). It is noted that the image forming processing is processing of discharging ink toward the sheet S and forming an image on the sheet S.

The flushing processing is processing of discharging ink toward the openings 31 of the flushing area 30 not overlapping with the sheets S out of the plurality of flushing areas 30 of the conveying belt 3. Specifically, the flushing processing is processing of discharging ink at a timing different from a timing of forming an image on the sheet S. The discharge ink of the flushing processing does not contribute to printing. The discharge ink of the flushing processing passes through the openings 31 without being directed toward the sheet S and reaches the inner circumferential side of the conveying belt 3 to be stored in the waste ink tank 21. By carrying out the flushing processing, clogging is suppressed.

Hereinafter, focusing on a certain recording head 40, a control method of the flushing processing will be described. Since the following descriptions can be referenced to describe the control method of the flushing processing of other recording heads 40, descriptions thereof will be omitted. The same holds true for a control method of meniscus oscillation processing to be described later.

While executing the consecutive printing job (that is, while conveying the sheets S by the conveying belt 3), the control portion 6 causes the recording head 40 to carry out the flushing processing at a timing at which the flushing area 30 not overlapping with the sheets S and the recording head 40 oppose each other in the up-down direction. In one flushing processing, the recording head 40 discharges ink a plurality of times from the respective nozzles 4N. At the timing at which the recording head 40 opposes the flushing area 30 in the up-down direction, the recording head 40 discharges ink from the nozzles 4N and causes the ink to pass through the openings 31. The ink discharged in the flushing processing passes through the openings 31, so the ink does not adhere onto the conveying belt 3.

Herein, in the consecutive printing job, the conveyance of the sheets S is controlled such that the flushing area 30 appears in the spaces between the sheets at a certain cycle. In other words, while executing the consecutive printing job, the flushing area 30 not overlapping with the sheets S and the recording head 40 oppose each other repetitively in the up-down direction.

In this regard, while executing the consecutive printing job, the control portion 6 causes the recording head 40 to carry out the flushing processing a plurality of times. While executing the consecutive printing job, the control portion 6 causes the recording head 40 to carry out the flushing processing every time the recording head 40 and the flushing area 30 oppose each other in the up-down direction.

<General Outline of Meniscus Oscillation Processing>

Figure 10:
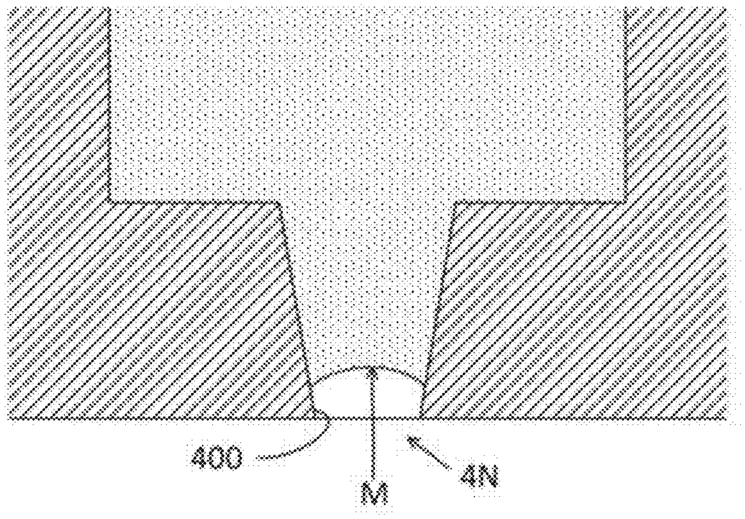
FIG. 10 is a diagram for explaining meniscus oscillation processing that is carried out by the recording head in the inkjet recording apparatus according to one embodiment.

As shown in FIG. 10, the nozzle 4N has an ink discharge outlet 400 on the nozzle surface. The ink discharge outlet 400 is an opening formed on the nozzle surface. The ink inside the nozzle 4N is discharged via the ink discharge outlet 400. However, if the ink inside the nozzle 4N thickens and the ink is forcibly discharged from the nozzle 4N in that state, the ink discharged from the nozzle 4N may proceed in unintended directions.

In this regard, the recording head 40 carries out the meniscus oscillation processing in which a meniscus of the ink inside the nozzle 4N is caused to oscillate. In FIG. 10, the meniscus of the ink is denoted by a symbol M. The recording head 40 carries out the meniscus oscillation processing for each of the plurality of nozzles 4N. The recording head 40 carries out the meniscus oscillation processing before discharging ink. In other words, the recording head 40 carries out the meniscus oscillation processing before the image forming processing (that is, right before the image forming processing). Further, the recording head 40 carries out the meniscus oscillation processing before the flushing processing (that is, right before the flushing processing). By carrying out the meniscus oscillation processing, thickening of the ink inside the nozzle is suppressed.

However, in some cases, the oscillation of the meniscus of the ink by the meniscus oscillation processing is insufficient. Specifically, irrespective of the fact that the meniscus oscillation processing is carried out before the flushing processing, ink discharged in the flushing processing may be spattered in unintended directions to thus leave ink smudges on the conveying belt 3.

In contrast, in the printer 100 according to the embodiment of the present disclosure, it is possible to suppress ink smudges on the conveying belt 3 as will be described below.

The control portion 6 controls the meniscus oscillation processing by the recording head 40. Specifically, the control portion 6 controls the number of oscillations of the meniscus in the meniscus oscillation processing (that is, the number of driving pulses to be applied to the piezoelectric actuator PA). The control portion 6 controls a magnitude of the oscillation of the meniscus in the meniscus oscillation processing (that is, an amplitude of the driving voltage to be applied to the piezoelectric actuator PA). The control portion 6 also controls an execution timing of the meniscus oscillation processing.

When causing the recording head 40 to carry out the meniscus oscillation processing, the control portion 6 controls the driver circuit DR to apply a minute voltage to the piezoelectric actuator PA. Thus, the vibration plate constituting a part of an ink supplying path vibrates. At this time, the vibration is transmitted to the meniscus of the ink in the vicinity of the ink discharge outlet 400 via the ink inside the nozzle 4N. As a result, the meniscus of the ink in the vicinity of the ink discharge outlet 400 oscillates.

By carrying out the meniscus oscillation processing, the ink inside the nozzle 4N is stirred. Thus, the thickening of the ink inside the nozzle 4N is suppressed. It is noted that even when the meniscus of the ink in the vicinity of the ink discharge outlet 400 oscillates, since that oscillation is small, the leak of the ink from the nozzle 4N is suppressed.

<Number of Oscillations in Meniscus Oscillation Processing>

Hereinafter, the number of oscillations of the meniscus of the ink in the meniscus oscillation processing (hereinafter, will simply be referred to as "the number of oscillations in the meniscus oscillation processing") will be described.

The control portion 6 controls the number of oscillations in the meniscus oscillation processing that is carried out before the image forming processing for each of the nozzles 4N. Further, the control portion 6 controls the number of oscillations in the meniscus oscillation processing that is carried out before the flushing processing for each of the nozzles 4N. Hereinafter, details will be described with reference to FIG. 11.

Figure 11:
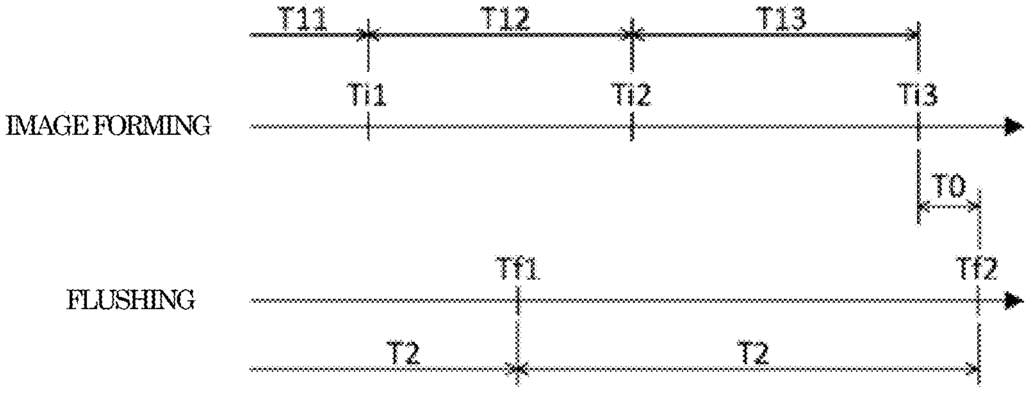
FIG. 11 is a diagram showing respective timings of image forming processing and flushing processing that are carried out by the recording head in the inkjet recording apparatus according to one embodiment.

It is noted that FIG. 11 shows ink discharge timings of a certain nozzle 4N. The "image forming" in FIG. 11 shows the ink discharge timings in the image forming processing. The "flushing" in FIG. 11 shows the ink discharge timings in the flushing processing.

In descriptions below, it is assumed that the image forming processing is carried out in the stated order of a time point Ti1, a time point Ti2, and a time point Ti3, and the flushing processing is carried out in the stated order of a time point Tf1 and a time point Tf2. It is noted that the time point Ti1 is a time point earlier than the time point Tf1. The time point Ti2 and the time point Ti3 are time points between the time point Tf1 and the time point Tf2.

When causing the nozzle 4N to carry out the meniscus oscillation processing that is carried out before the image forming processing, the control portion 6 recognizes a first amount of time that has elapsed before the image forming processing to be carried out this time since the image forming processing carried out last time by the nozzle 4N that is to carry out the meniscus oscillation processing this time. Then, the control portion 6 sets the number of oscillations in the meniscus oscillation processing that is carried out before the image forming processing based on the first amount of time. The control portion 6 sets the number of oscillations before the image forming processing to increase as the first amount of time becomes longer.

In the example shown in FIG. 11, amounts of time indicated by symbols T11 to T13 correspond to the first amount of time. Although not shown, the first amount of time T11 is an amount of time that has elapsed before the image forming processing at the time point Ti1 since the last image forming processing carried out before the image forming processing at the time point Ti1. Herein, T11<T12<T13 is established.

In the example shown in FIG. 11, since the first amount of time T11 is the shortest, the number of oscillations in the meniscus oscillation processing that is carried out before the image forming processing at the time point Ti1 becomes the smallest among the meniscus oscillation processing that is carried out before the respective image forming processing at the time point Ti1 to the time point Ti3. On the other hand, since the first amount of time T13 is the longest, the number of oscillations in the meniscus oscillation processing that is carried out before the image forming processing at the time point Ti3 becomes the largest among the meniscus oscillation processing that is carried out before the respective image forming processing at the time point Ti1 to the time point Ti3.

For example, first information 101 for setting the number of oscillations in the meniscus oscillation processing that is carried out before the image forming processing is stored in the storage portion 7 (see FIG. 4). The first information 101 is information that defines a correspondence relationship between the number of oscillations in the meniscus oscillation processing and the first amount of time such that the number of oscillations in the meniscus oscillation processing increases as the first amount of time becomes longer.

The control portion 6 sets the number of oscillations in the meniscus oscillation processing that is carried out before the image forming processing based on the first information 101. Specifically, when causing the nozzle 4N to carry out the meniscus oscillation processing that is carried out before the image forming processing, the control portion 6 recognizes, based on the first information 101, the number of oscillations corresponding to the first amount of time of the nozzle 4N that is to carry out the meniscus oscillation processing that is carried out before the image forming processing this time, and sets the recognized number of oscillations as the number of oscillations in the meniscus oscillation processing to be carried out this time. As a result, the number of oscillations in the meniscus oscillation processing to be carried out by each nozzle 4N increases as the corresponding first amount of time becomes longer.

Further, when causing the nozzle 4N to carry out the meniscus oscillation processing that is carried out before the flushing processing, the control portion 6 recognizes a second amount of time that has elapsed before the flushing processing to be carried out this time since the flushing processing carried out last time by the nozzle 4N that is to carry out the meniscus oscillation processing this time. Then, the control portion 6 sets the number of oscillations in the meniscus oscillation processing that is carried out before the flushing processing based on the second amount of time. The control portion 6 sets the number of oscillations before the flushing processing to increase as the second amount of time becomes longer.

In the example shown in FIG. 11, amounts of time indicated by a symbol T2 correspond to the second amount of time. When the sizes of the plurality of sheets S to be used in the consecutive printing job are the same, the second amount of time is constant.

For example, as shown in FIG. 8, when the sheets S to be used in the consecutive printing job are of the A4 size in landscape orientation (the sheets S shown on the second row from the bottom in FIG. 8), a time corresponding to an interval L1 becomes the second amount of time T2. When the sheets S to be used in the consecutive printing job are of the A4 size in landscape orientation, all of the plurality of flushing areas 30 do not overlap with the sheets S, so the second amount of time T2 becomes the shortest.

When the sheets S to be used in the consecutive printing job are of the A3 size (the sheets S shown on the sixth row from the top in FIG. 8), a time corresponding to an interval L2 larger than the interval L1 becomes the second amount of time T2. When the sheets S to be used in the consecutive printing job are of the A3 size, the second amount of time T2 becomes longer than that of the case where the sheets S are of the A4 size in landscape orientation.

When the sheets S to be used in the consecutive printing job are of the A4 size in portrait orientation (the sheets S shown on the third row from the top in FIG. 8), a time corresponding to an interval L3 larger than the interval L2 becomes the second amount of time T2. When the sheets S to be used in the consecutive printing job are of the A4 size in portrait orientation, the second amount of time T2 becomes longer than that of the case where the sheets S are of the A3 size.

In this manner, the length of the second amount of time T2 varies in accordance with the size of the sheets S to be used in the consecutive printing job in the conveying direction. In other words, the number of oscillations in the meniscus oscillation processing that is carried out before the flushing processing varies in accordance with the size of the sheets S to be used in the consecutive printing job in the conveying direction.

For example, the second amount of time T2 in the case where the sheets S are of the A3 size (the amount of time corresponding to the interval L2 shown in FIG. 8) is longer than the second amount of time T2 in the case where the sheets S are of the A4 size in landscape orientation (the amount of time corresponding to the interval L1 shown in FIG. 8). Therefore, in the case where the sheets S are of the A3 size, the number of oscillations in the meniscus oscillation processing that is carried out before the flushing processing becomes larger than that in the case where the sheets S are of the A4 size in landscape orientation.

Further, the second amount of time T2 in the case where the sheets S are of the A4 size in portrait orientation (the amount of time corresponding to the interval L3 shown in FIG. 8) is longer than the second amount of time T2 in the case where the sheets S are of the A3 size (the amount of time corresponding to the interval L2 shown in FIG. 8). Therefore, in the case where the sheets S are of the A4 size in portrait orientation, the number of oscillations in the meniscus oscillation processing that is carried out before the flushing processing becomes larger than that in the case where the sheets S are of the A3 size.

For example, second information 102 for setting the number of oscillations in the meniscus oscillation processing that is carried out before the flushing processing is stored in the storage portion 7 (see FIG. 4). The second information 102 is information that defines a correspondence relationship between the number of oscillations in the meniscus oscillation processing and the second amount of time such that the number of oscillations in the meniscus oscillation processing increases as the second amount of time becomes longer.

In the second information 102, the number of oscillations is defined with respect to each of the amount of time corresponding to the interval L1, the amount of time corresponding to the interval L2, and the amount of time corresponding to the interval L3. The number of oscillations corresponding to the amount of time corresponding to the interval L3 is the largest, and the number of oscillations corresponding to the amount of time corresponding to the interval L1 is the smallest.

The control portion 6 sets the number of oscillations in the meniscus oscillation processing that is carried out before the flushing processing based on the second information 102. Specifically, when causing the nozzle 4N to carry out the meniscus oscillation processing that is carried out before the flushing processing, the control portion 6 recognizes, based on the second information 102, the number of oscillations corresponding to the second amount of time of the nozzle 4N that is to carry out the meniscus oscillation processing that is carried out before the flushing processing this time, and sets the recognized number of oscillations as the number of oscillations in the meniscus oscillation processing to be carried out this time. As a result, the number of oscillations in the flushing processing to be carried out by each nozzle 4N increases as the corresponding second amount of time becomes longer.

It is noted that when the number of oscillations in the meniscus oscillation processing that is carried out before the flushing processing is set based on the second amount of time, the number of oscillations in the meniscus oscillation processing that is carried out before the flushing processing during execution of the consecutive printing job becomes the same among the nozzles 4N.

On the other hand, when executing, after completing a first consecutive printing job, a second consecutive printing job that uses sheets S of a size different from that of the sheets S used in the first consecutive printing job, the number of oscillations in the meniscus oscillation processing that is carried out before the flushing processing may be changed. For example, when the size of the sheets S used in the first consecutive printing job is the A4 size in landscape orientation and the size of the sheets S used in the second consecutive printing job is the A4 size in portrait orientation, the second amount of time of the second consecutive printing job becomes longer than the second amount of time of the first consecutive printing job. Thus, the number of oscillations of the meniscus becomes larger in the meniscus oscillation processing that is carried out before the flushing processing in the second consecutive printing job than in the meniscus oscillation processing that is carried out before the flushing processing in the first consecutive printing job.

In the configuration of the present embodiment, it is possible to suppress a situation where the ink discharged from the recording head 40 in the flushing processing adheres onto the conveying belt 3. Hereinafter, details will be described.

In the conventional configuration, when setting the number of oscillations in the meniscus oscillation processing for a certain nozzle 4N (will be referred to as a target nozzle 4N herein), the number of oscillations in the meniscus oscillation processing is set to increase as an elapsed time since the last time the target nozzle 4N has discharged ink becomes longer, and the number of oscillations in the meniscus oscillation processing is set to decrease as the elapsed time since the last time the target nozzle 4N has discharged ink becomes shorter.

Therefore, in the conventional configuration, irrespective of the number of ink discharge times (that is, a printing rate) of the target nozzle 4N within a period from the last time the flushing processing has been carried out to the time the flushing processing is carried out this time, the number of oscillations in the meniscus oscillation processing that is carried out before the flushing processing regarding the target nozzle 4N increases as the elapsed time since the last time the target nozzle 4N has discharged ink becomes longer, and the number of oscillations in the meniscus oscillation processing that is carried out before the flushing processing regarding the target nozzle 4N decreases as the elapsed time since the last time the target nozzle 4N has discharged ink becomes shorter.

It is noted that the period from the last time the flushing processing has been carried out to the time the flushing processing is carried out this time is a period during which the target nozzle 4N opposes the sheet S, is a period during which ink adheres onto the sheet S when the ink is discharged from the target nozzle 4N, and is a period during which an image can be formed on the sheet S. In descriptions below, the period from the last time the flushing processing has been carried out to the time the flushing processing is carried out this time will be referred to as an image forming period.

Herein, in the flushing processing, there is a need to cause the ink to be discharged toward the openings 31 and cause the ink to pass through the openings 31 for suppressing adherence of the ink onto the conveying belt 3. However, if the ink is thickened, the discharged ink may proceed in unintended directions and adhere onto the conveying belt 3. Therefore, in the meniscus oscillation processing that is carried out before the flushing processing, it is favorable to increase the number of oscillations in the meniscus oscillation processing if the ink is thickened.

Specifically, when the number of ink discharge times within the image forming period of the target nozzle 4N is large, the thickening of the ink is suppressed, so the number of oscillations in the meniscus oscillation processing that is carried out before the flushing processing may be set to be small. On the other hand, when the number of ink discharge times within the image forming period of the target nozzle 4N is small, the ink easily thickens. Therefore, in the meniscus oscillation processing that is carried out before the flushing processing in the case where the number of ink discharge times within the image forming period of the target nozzle 4N is small, it is favorable to increase the number of oscillations in the meniscus oscillation processing irrespective of the elapsed time since the last time the target nozzle 4N has discharged ink (for example, even when the last time the target nozzle 4N has discharged ink is right before the flushing processing).

In the conventional configuration, however, in setting the number of oscillations in the meniscus oscillation processing that is carried out before the flushing processing, even when the number of ink discharge times within the image forming period of the target nozzle 4N is small, if the elapsed time since the last time the target nozzle 4N has discharged ink is short (for example, the last time the target nozzle 4N has discharged ink is right before the flushing processing), the number of oscillations in the meniscus oscillation processing is set to be small. In the example shown in FIG. 11, for example, the number of oscillations in the meniscus oscillation processing that is carried out before the flushing processing at the time point Tf2 is set based on an amount of time T0. Therefore, there is a possibility that the ink discharged in the flushing processing will be spattered to adhere onto the conveying belt 3.

Meanwhile, in the configuration of the present embodiment, the number of oscillations in the meniscus oscillation processing that is carried out before the image forming processing is set based on the first amount of time, and the number of oscillations in the meniscus oscillation processing that is carried out before the flushing processing is set based on the second amount of time. In the example shown in FIG. 11, for example, the number of oscillations in the meniscus oscillation processing that is carried out before the flushing processing at the time point Tf2 is set based on the second amount of time T2 from the flushing processing carried out last time to the flushing processing to be carried out this time instead of the amount of time T0.

Figure 12:
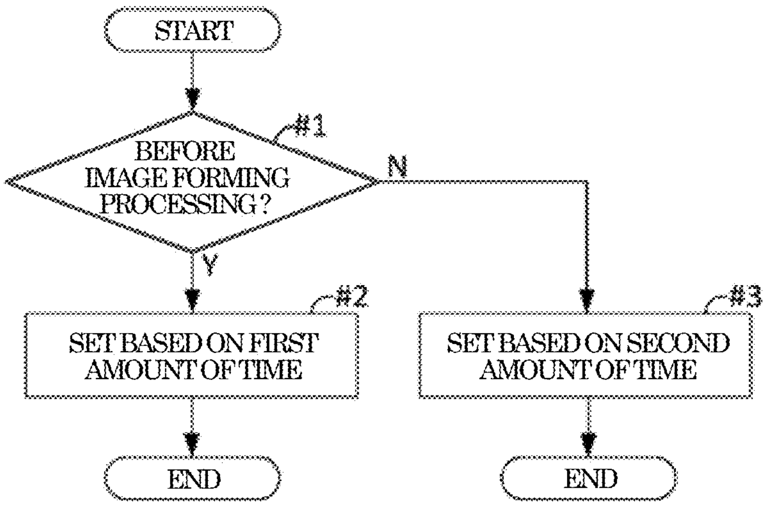
FIG. 12 is a diagram showing a flow of processing carried out by a control portion of the inkjet recording apparatus according to one embodiment.

In other words, in the configuration of the present embodiment, when setting the number of oscillations in the meniscus oscillation processing, processing along the flow shown in FIG. 12 is carried out. Specifically, when setting the number of oscillations in the meniscus oscillation processing, the control portion 6 determines whether or not the meniscus oscillation processing for which the number of oscillations is to be set this time is the meniscus oscillation processing that is carried out before the image forming processing (Step #1). When the meniscus oscillation processing is the meniscus oscillation processing that is carried out before the image forming processing, the processing shifts to Step #2. When the meniscus oscillation processing is not the meniscus oscillation processing that is carried out before the image forming processing, that is, the meniscus oscillation processing is the meniscus oscillation processing that is carried out before the flushing processing, the processing shifts to Step #3.

When shifted to Step #2, the control portion 6 sets the number of oscillations in the meniscus oscillation processing based on the first amount of time. When shifted to Step #3, the control portion 6 sets the number of oscillations in the meniscus oscillation processing based on the second amount of time.

In the configuration of the present embodiment, by setting the number of oscillations in the meniscus oscillation processing that is carried out before the flushing processing based on the second amount of time, even when the number of ink discharge times within the image forming period of the target nozzle 4N is small and the elapsed time since the last time the target nozzle 4N has discharged ink is short, it is possible to suppress a situation where the number of oscillations in the meniscus oscillation processing that is carried out before the flushing processing becomes small. Thus, it is possible to suppress a situation where the ink is discharged in a thickened state and the ink proceeds in unintended directions in the flushing processing. In other words, a situation where the ink adheres onto the conveying belt 3 to leave smudges on the conveying belt 3 can be suppressed. If the adherence of the ink onto the conveying belt 3 is suppressed, smears on the sheets S due to the transfer of ink on the conveying belt 3 onto the sheets S can be suppressed.

Further, in the configuration of the present embodiment, the control portion 6 increases the number of oscillations in the meniscus oscillation processing that is carried out before the image forming processing as the first amount of time becomes longer. Moreover, the control portion 6 increases the number of oscillations in the meniscus oscillation processing that is carried out before the flushing processing as the second amount of time becomes longer. Thus, since a situation where the image forming processing is carried out in a state where the ink is thickened can be suppressed, image quality is improved. In addition, a situation where the flushing processing is carried out in a state where the ink is thickened can be suppressed with ease.

It is noted that it is more difficult for the ink to thicken in the case where the number of ink discharge times within the image forming period is large than in the case where the number of ink discharge times is small. In this regard, in the case where the number of ink discharge times within the image forming period is large, the number of oscillations in the meniscus oscillation processing that is carried out before the flushing processing may be set to be smaller than that in the case where the number of ink discharge times is small. In other words, the number of oscillations in the meniscus oscillation processing set based on the second amount of time may be corrected.

In a configuration in which the number of oscillations in the meniscus oscillation processing set based on the second amount of time is corrected, when causing the nozzle 4N to carry out the meniscus oscillation processing that is carried out before the flushing processing, the control portion 6 recognizes the number of ink discharge times within the image forming period from the flushing processing carried out last time to the flushing processing to be carried out this time by the nozzle 4N that is to carry out the meniscus oscillation processing this time. Then, the control portion 6 carries out, based on the number of ink discharge times within the image forming period, a number-of-times correction to reduce the number of oscillations in the meniscus oscillation processing set based on the second amount of time. When carrying out the number-of-times correction, the control portion 6 increases the decrease rate of the number of oscillations in the meniscus oscillation processing as the number of ink discharge times within the image forming period increases.

Thus, it is possible to suppress a situation where the meniscus of the ink is oscillated more than necessary in the meniscus oscillation processing. Moreover, in such control, since the processing content of the meniscus oscillation can be determined based on whether the next discharge is printing or not if the first amount of time and the second amount of time are managed, an information processing amount to be processed by the control portion 6 when carrying out the meniscus oscillation can be reduced. In a line printer as in the present embodiment, the number of ink discharge times of one nozzle 4N is several tens of thousands of times per second, and the number of nozzles 4N of each color is also several thousands, so the information processing amount to be processed by the control portion 6 is massive. It is possible to carry out, for each nozzle 4N, more complex information processing based on the state of the printing or flushing that has been carried out until then and optimize the meniscus oscillation processing in more detail, but a necessary information processing amount increases. By performing the control as described above, the meniscus oscillation processing can be carried out without excessively increasing the information processing amount.

It is noted that in the meniscus oscillation processing, the ink may leak from the nozzle 4N due to the oscillation of the meniscus of the ink. In other words, the ink may be unintentionally discharged from the nozzle 4N. Therefore, it is favorable to suppress a situation where the number of oscillations of the meniscus of the ink becomes unnecessarily large.

Further, the ink is more apt to leak from the nozzle 4N as the oscillation of the meniscus of the ink inside the nozzle 4N becomes larger. In this regard, the magnitude of the oscillation of the meniscus of the ink in the meniscus oscillation processing may be corrected. It is noted that in the meniscus oscillation processing, a minute voltage is applied to the piezoelectric actuator PA to thus cause the meniscus of the ink inside the nozzle 4N to oscillate. In other words, for correcting the magnitude of the oscillation of the meniscus of the ink in the meniscus oscillation processing, it is only necessary to change the magnitude of the application voltage to the piezoelectric actuator PA.

In the configuration in which the magnitude of the oscillation of the meniscus of the ink in the meniscus oscillation processing is corrected, when causing the nozzle 4N to carry out the meniscus oscillation processing that is carried out before the flushing processing, the control portion 6 recognizes the number of ink discharge times within the image forming period from the flushing processing carried out last time to the flushing processing to be carried out this time by the nozzle 4N that is to carry out the meniscus oscillation processing this time. Then, the control portion 6 makes the oscillation of the meniscus of the ink in the meniscus oscillation processing smaller as the number of ink discharge times within the image forming period increases (that is, carries out oscillation correction).

Specifically, when not carrying out the oscillation correction, the control portion 6 applies a predetermined voltage to the piezoelectric actuator PA. Then, when carrying out the oscillation correction, the control portion 6 applies a correction voltage smaller than the predetermined voltage to the piezoelectric actuator PA.

Thus, it is possible to suppress a situation where the oscillation of the meniscus of the ink becomes unnecessarily large in the meniscus oscillation processing. It is noted that in the meniscus oscillation processing, the oscillation of the meniscus of the ink may cause a leak of the ink from the nozzle 4N. In other words, the ink may be unintentionally discharged from the nozzle 4N. Therefore, it is favorable to suppress the situation where the oscillation of the meniscus of the ink becomes unnecessarily large.

All the points described in the embodiment according to the present disclosure are mere examples and should not be considered in a limitative manner. The scope of the present disclosure is presented in the scope of claims instead of in the detailed descriptions and further includes all modifications within meanings and scope equivalent to the scope of claims.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An inkjet recording apparatus, comprising:

a conveying belt which conveys a sheet;

a recording head which includes a plurality of nozzles that discharge ink and discharges the ink toward the sheet to form an image on the sheet; and a control portion which controls the recording head, wherein the conveying belt includes a flushing area formed with an opening, the flushing area is arranged plurally in a movement direction of the conveying belt with intervals provided therebetween, during conveyance of the sheet, the control portion causes the recording head to carry out, separate from image forming processing in which the ink is discharged toward the sheet, flushing processing in which the ink is discharged toward the opening of the flushing area not overlapping with the sheet, the control portion causes the recording head to carry out, before discharging the ink, meniscus oscillation processing in which a meniscus of the ink in each of the nozzles is caused to oscillate, the control portion controls, for each of the nozzles, the meniscus oscillation processing that is carried out before the image forming processing and the meniscus oscillation processing that is carried out before the flushing processing, when causing the nozzle to carry out the meniscus oscillation processing that is carried out before the image forming processing, the control portion sets a number of oscillations of the meniscus oscillation processing that is carried out before the image forming processing based on a first amount of time that has elapsed before the image forming processing to be carried out this time since the image forming processing carried out last time by the nozzle that is to carry out the meniscus oscillation processing this time, and when causing the nozzle to carry out the meniscus oscillation processing that is carried out before the flushing processing, the control portion sets a number of oscillations of the meniscus oscillation processing that is carried out before the flushing processing based on a second amount of time that has elapsed before the flushing processing to be carried out this time since the flushing processing carried out last time by the nozzle that is to carry out the meniscus oscillation processing this time.

2. The inkjet recording apparatus according to claim 1, wherein the control portion sets the number of oscillations of the meniscus oscillation processing that is carried out before the image forming processing to increase as the first amount of time becomes longer, and sets the number of oscillations of the meniscus oscillation processing that is carried out before the flushing processing to increase as the second amount of time becomes longer.

3. The inkjet recording apparatus according to claim 1, wherein when causing the nozzle to carry out the meniscus oscillation processing that is carried out before the flushing processing, the control portion carries out a correction to reduce the number of oscillations of the meniscus oscillation processing that has been set based on the second amount of time, based on a number of ink discharge times obtained during a period from the flushing processing carried out last time to the flushing processing to be carried out this time by the nozzle that is to carry out the meniscus oscillation processing this time, and when carrying out the correction, the control portion increases a decrease rate of the number of oscillations of the meniscus oscillation processing as the number of ink discharge times increases.

4. The inkjet recording apparatus according to claim 1, wherein when causing the nozzle to carry out the meniscus oscillation processing that is carried out before the flushing processing, the control portion sets the oscillation of the meniscus in the meniscus oscillation processing to become smaller as a number of ink discharge times obtained during a period from the flushing processing carried out last time to the flushing processing to be carried out this time by the nozzle that is to carry out the meniscus oscillation processing this time increases.

* * * * *